(12) United States Patent
Grabowski et al.

(10) Patent No.: US 11,525,899 B2
(45) Date of Patent: Dec. 13, 2022

(54) OPTICAL SENSOR FOR DISTANCE AND/OR VELOCITY MEASUREMENT, SYSTEM FOR MOBILITY MONITORING OF AUTONOMOUS VEHICLES, AND METHOD FOR MOBILITY MONITORING OF AUTONOMOUS VEHICLES

(71) Applicant: Robert Bosch GmbH, Stuttgart (DE)

(72) Inventors: Johannes Grabowski, Reutlingen (DE); Thilo Grundmann, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 944 days.

(21) Appl. No.: 16/333,294

(22) PCT Filed: Sep. 22, 2017

(86) PCT No.: PCT/EP2017/074087
§ 371 (c)(1),
(2) Date: Mar. 14, 2019

(87) PCT Pub. No.: WO2018/060100
PCT Pub. Date: Apr. 5, 2018

(65) Prior Publication Data
US 2019/0242976 A1 Aug. 8, 2019

(30) Foreign Application Priority Data

Sep. 30, 2016 (DE) .......................... 102016219099.7

(51) Int. Cl.
*G01S 7/484* (2006.01)
*G01S 17/10* (2020.01)
(Continued)

(52) U.S. Cl.
CPC .............. *G01S 7/484* (2013.01); *G01S 17/10* (2013.01); *G01S 17/46* (2013.01); *G01S 17/58* (2013.01); *G01S 17/931* (2020.01)

(58) Field of Classification Search
CPC .......... G01S 7/484; G01S 17/10; G01S 17/26; G01S 17/32; G01S 17/46; G01S 17/58;
(Continued)

(56) References Cited

U.S. PATENT DOCUMENTS 5,517,201 A * 5/1996 Thompson, Jr. ........ G01S 17/04
250/341.1
5,966,227 A * 10/1999 Dubois ................... G01S 17/74
398/108
(Continued)

FOREIGN PATENT DOCUMENTS

EP 2887009 A1 6/2015
EP 2963445 A2 1/2016
(Continued)

OTHER PUBLICATIONS

"Kim, Gunzung, Eom, Jeongsook, Park, Yongwanm, A hybrid 3D LIDAR imager based on pixel-by-pixel scanning and DSOCDMA, Mar. 16, 2016" (Year: 2016).*
(Continued)

*Primary Examiner* — Luke D Ratcliffe
(74) *Attorney, Agent, or Firm* — Norton Rose Fulbright US LLP; Gerard Messina (57) ABSTRACT

An optical sensor is provided for distance and/or velocity measurement including a light source module for generating a light signal and a detection module for detecting a light signal. The light source module includes a modulator for modulating the light signal, the modulator being configured in such a way that the light signal includes a piece of identification information after the modulation, the detection module being configured to detect and identify a piece of identification information of the detected light signal.

13 Claims, 3 Drawing Sheets

(51) Int. Cl.
*G01S 17/46* (2006.01)
*G01S 17/931* (2020.01)
*G01S 17/58* (2006.01)

(58) Field of Classification Search
CPC ...... G01S 17/931; G01S 17/86; G01S 13/867;
G01S 17/02; G01S 17/04; G01S 17/06;
G01S 17/08; G01S 17/50; G01S 17/93;
G01S 7/486; G06T 17/00; G06T 7/521;
G06T 7/70; G06T 2207/10028
See application file for complete search history.

(56) References Cited

U.S. PATENT DOCUMENTS

| | | | |
|---|---|---|---|
| 9,002,511 B1 | 4/2015 | Hickerson et al. | |
| 9,668,322 B1* | 5/2017 | Winarski | G01S 17/08 |
| 2006/0153571 A1* | 7/2006 | Nishimura | G06F 3/0421 |
| | | | 398/140 |
| 2006/0273924 A1* | 12/2006 | Schwartz | G08G 1/087 |
| | | | 340/907 |
| 2010/0271617 A1* | 10/2010 | Damink | G01S 17/931 |
| | | | 398/118 |
| 2013/0015977 A1* | 1/2013 | Scott | G01S 17/10 |
| | | | 340/600 |
| 2014/0320317 A1* | 10/2014 | Grauer | G08G 1/096716 |
| | | | 340/907 |
| 2016/0109575 A1* | 4/2016 | Oggier | G01S 7/4915 |
| | | | 356/51 |
| 2016/0282449 A1* | 9/2016 | Slobodyanyuk | G01S 7/0235 |
| 2017/0241774 A9* | 8/2017 | Brandli | G01S 7/4816 |
| 2018/0074198 A1* | 3/2018 | Von Novak | G01S 7/487 |

FOREIGN PATENT DOCUMENTS

| | | | |
|---|---|---|---|
| EP | 2786172 B1 * | 1/2022 | B61L 25/02 |
| WO | 2006130362 A2 | 12/2006 | |
| WO | 2014195020 A1 | 12/2014 | |

OTHER PUBLICATIONS

"Yan Tang, Xingwen Yi, William Shieh, optical performance monitoring for coherent optical systems, 2010, p. 351-383" (Year: 2010).*

International Search Report for PCT/EP2017/074087, dated Dec. 11, 2017.

Kim Gunzung et al., "A Hybrid 3D LIDAR Imager Based on Pixel-by-Pixel Scanning and DS-OCDMA", Proceedings Optical Diagnostics of Living Cells II, SPIE, US, vol. 9751, 2016, pp. 975119-975119, XP060065536.

* cited by examiner

OPTICAL SENSOR FOR DISTANCE AND/OR VELOCITY MEASUREMENT, SYSTEM FOR MOBILITY MONITORING OF AUTONOMOUS VEHICLES, AND METHOD FOR MOBILITY MONITORING OF AUTONOMOUS VEHICLES

FIELD

The present invention is directed to an optical sensor for distance and/or velocity measurement. Furthermore, the present invention is directed to a system for mobility monitoring of autonomous vehicles and a method for mobility monitoring of autonomous vehicles.

BACKGROUND INFORMATION

Conventional optical sensors are used, for example, to enable the monitoring of movements of autonomous vehicles in robotics. Thus, for example, in warehouses, autonomously acting industrial trucks such as forklifts are equipped with such sensors, or in the private area, vacuum cleaner robots are provided with such sensors to enable secure navigation and object recognition and/or to secure hazard zones.

It is disadvantageous that the optical sensors may mutually obstruct one another in a system having multiple such autonomous vehicles. The detection modules are thus not capable of differentiating between the light signals from different light source modules, and/or the light signals from different light source modules, i.e., different optical sensors, mutually influence one another and thus corrupt the distance and/or velocity measurement. In particular in the case of a plurality of vehicles, this may result in substantial impairment of the navigational safety, or even severe accidents.

SUMMARY

It is an object of the present invention to provide an optical system for distance and/or velocity measurement, a system for mobility monitoring of autonomous vehicles, and a method for mobility monitoring of autonomous vehicles, each optical sensor or each autonomous vehicle having such an optical sensor being unambiguously identifiable on the basis of its light signal.

The optical sensor according to the present invention, the system according to the present invention, and the method according to the present invention may have the advantage over the related art that the optical sensor has a small installation space requirement, that each optical sensor is unambiguously identifiable on the basis of the identification information and may also carry out this identification itself, so that only the associated light signal or the associated reflected light signal is always used for the distance and/or velocity determination. Safe and interference-free navigation and/or correct object recognition is advantageously possible in this way. In particular in systems in which a base station is used, it may identify the vehicles and thus locate them. This enables better control of the systems and the vehicles.

According to the present invention, the light signal or the reflected light signal thus transmits a piece of information, namely the identification information, with the aid of which the optical sensor which has generated the light signal may be identified, in particular unambiguously. For example, the identification information includes a serial number associated with the optical sensor. The identification information is preferably a piece of digital information, particularly preferably the identification information includes a sequence of bits, very particularly preferably 4 bits, 8 bits, 16 bits, 32 bits, or 64 bits. A bit coding of the identification information may advantageously be achieved by an intensity modulation. The identification information may in particular have an arbitrary length, which may be dependent, for example, on the number of the optical sensors in the system and/or the type of the modulation and is essentially only limited by the chronological length of the light signal. Other types of identification information and/or codes are also possible. The identification information is preferably applied to the light signal repeatedly. The distance and/or velocity measurement is not impaired by the identification information. The identification information thus corresponds, figuratively speaking, to a digital fingerprint, which enables an association of a light signal and/or a reflected light signal with a specific optical sensor. Those skilled in the art understand that the modulation may be carried out in both analog and digital fashion. In particular, the modulation is an amplitude modulation, a frequency modulation, and/or an intensity modulation. However, the modulation is particularly preferably a sequence modulation.

Advantageous embodiments and refinements of the present invention are described herein with reference to the figures.

According to one preferred refinement of the present invention, it is provided that the light signal includes a carrier signal, onto which a useful signal is modulated, the carrier signal including a carrier signal frequency and the useful signal including a modulation frequency, the useful signal including at least the identification information. This means in particular that the modulation frequency is higher than the carrier signal frequency. It is particularly preferably provided that the light source module emits the light signal at a carrier signal frequency in the range of 1 Hz to 100 Hz, particularly preferably in the range of 10 Hz to 75 Hz, very particularly preferably in the range of 30 Hz to 60 Hz. The carrier signal is preferably used for the distance and/or velocity measurement, while the useful signal is at least partially used for the identification of the optical sensor. Those skilled in the art understand that this means in particular that in the case of a piece of digital identification information, the length of the identification information is dependent on the modulation frequency, in particular on the ratio of carrier signal frequency to modulation frequency. Thus, for example, for a carrier signal frequency of 1 Hz and a modulation frequency of 1 kHz, 1000 states may be transmitted.

According to one preferred refinement, it is provided that the modulation frequency is higher than a first detection frequency of the detection module, and/or that the modulation frequency is in the range between 100 Hz to 1 MHz, particularly preferably between 1 kHz and 100 kHz, very particularly preferably the modulation frequency is 2 kHz. Those skilled in the art understand that the identification information thus corresponds in particular to a specific modulation of the light signal. The modulation frequency of a light signal is particularly preferably variable in the time curve. The identification information is very particularly preferably unique, i.e., characteristic, for the corresponding optical sensor.

In this way, it is advantageously possible according to the present invention that the light signal is unambiguously identifiable, on the one hand, by the identification information, i.e., a specific modulation or a sequence of modulations and, on the other hand, the detection of the light signal necessary for the distance and/or velocity determination is not impaired.

According to one preferred refinement, it is provided that the optical sensor and in particular the light source module, the detection module, and/or the modulator are situated in one housing. The optical sensor particularly preferably additionally includes a control module for controlling the light source module and/or the detection module, the control module very particularly preferably also being situated in the housing.

In this way, it is advantageously possible according to the present invention that a compact optical sensor is provided, which is simple to install and to service.

According to one preferred refinement, it is provided that the modulator includes at least one modulation means for modulating the light signal, particularly preferably an aperture, a mirror, and/or a prism. Such a modulation is an analog intensity modulation and the listed modulation means are also referred to as a chopper and represent a particularly simple way of achieving a rectangular intensity modulation in particular. The aperture is particularly preferably a rotating sector aperture and/or the mirror is an angled mirror. The modulation means very particularly preferably includes a motor, in particular an electric motor, for generating a movement of the aperture, the mirror, and/or the prism.

In this way, it is advantageously possible according to the present invention that a modulation of the light signal for generating the identification information is carried out in a simple manner, in particular using conventional means.

According to one preferred refinement, it is provided that the modulator includes an electronic and/or digital modulation means. In particular, the modulation means is a logical modulation means, i.e., the modulation is produced by software.

According to one preferred refinement, it is provided that the modulation is an intensity modulation, the intensity preferably being either 0% or 100% of a starting intensity of the light signal. The intensity modulation particularly preferably varies between three, four, five, or six predetermined intensities.

In this way, it is advantageously possible according to the present invention to provide a simple piece of identification information which is simple to produce. Such a piece of intensity information may be produced in a simple manner, for example, by a rotating aperture, in particular rotating at variable speed.

According to one preferred refinement, it is provided that the light source module encompasses a laser, the light signal being a laser signal in particular. The laser is particularly preferably a semiconductor laser. The laser signal very particularly preferably has a nonvisible wavelength, in particular in the infrared range. Still more preferably, the light source module is configured for generating a laser signal having a wavelength in the range from 700 nm to 1000 nm, particularly preferably in the range from 850 nm to 950 nm, in particular in the range from 900 nm to 910 nm. The light source module preferably encompasses a beamforming optical unit, in particular at least one lens.

In this way, it is advantageously possible according to the present invention that a light signal is generated which is strongly focused and is very coherent. Precise and rapid measurements are possible using a laser signal, i.e., in particular using a laser beam. In particular time-of-flight measurements, as are used for distance and/or spacing measurement and/or velocity measurement, may be carried out particularly precisely using a laser because of the optical properties thereof.

According to one preferred refinement, it is provided that the detection module includes a dynamic image processing sensor. The dynamic image processing sensor particularly preferably includes a plurality of pixels, the dynamic image processing sensor being configured in such a way that each pixel detects changes. The pixels very particularly preferably register changes in the microsecond range. Such a dynamic image processing sensor is available, for example, from iniLabs as a Dynamic Vision Sensor (DVS). Those skilled in the art understand that in contrast to conventional cameras or image sensors, a sequence of snapshots of all pixels, so-called frames, is not produced, but rather the pixels are registered in which changes are detected. The function of a dynamic image processing sensor is therefore similar to that of a human eye or the retina. It is preferably provided that the detection module has a first detection frequency, the dynamic image processing sensor still more preferably having a second detection frequency. The first detection frequency is preferably in the range of 1 Hz to 100 Hz, particularly preferably in the range of 10 Hz to 75 Hz, very particularly preferably in the range of 30 Hz to 60 Hz, and is in particular at least as high as the carrier signal frequency. The second detection frequency is preferably in the range of 100 Hz to 1 MHz, particularly preferably between 1 kHz and 100 kHz, the second detection frequency is very particularly preferably 2 kHz, and it is in particular at least as high as the modulation frequency. This is to be understood in particular in such a way that the dynamic image processing sensor registers individual measured values at the second detection frequency and therefore may register the modulation of the light signal and preferably demodulate it, and these measured values are combined to form a frame in a time interval corresponding to the first detection frequency and/or are associated with this frame. For example, the detection module has a first detection frequency of 1 Hz and the dynamic image processing sensor has a second detection frequency of 1 kHz, the first detection frequency corresponding to the carrier signal frequency and the second detection frequency corresponding to the modulation frequency. In this case, the dynamic image processing sensor registers the identification information of the optical sensor within one frame, i.e., one second here, and at the same time a distance and/or velocity measurement may be carried out on the basis of the frame.

In this way, it is advantageously possible according to the present invention that the detection module operates very rapidly and with low data volume. A dynamic image processing sensor therefore requires small quantities of data memory and operates with high resolution with respect to time. Moreover, it is advantageously possible using a dynamic image processing sensor to detect moving objects more rapidly, since the pixels at which changes may be established in the time curve are detected separately because of the function of a dynamic image processing sensor.

According to one preferred refinement, it is provided that the optical sensor is a LIDAR sensor, in particular a LADAR sensor.

The LIDAR sensor is particularly preferably a time-of-flight measurement LIDAR sensor. Such a time-of-flight measurement LIDAR sensor (abbreviated TOF LIDAR; LIDAR being the abbreviation for "light detection and ranging") is based on the principle of time-of-flight measurement of light. A light signal, a laser signal in the case of a LADAR sensor (abbreviation for "laser detection and ranging"), is generated and emitted by the light source module. The light signal is reflected at an object and detected by the detector module. The distance to the object may be determined from the time-of-flight of the light signal, which is determined, for example, by interferometry, and in the case of a plurality of successive measurements, the velocity of the object may also be determined. Time-of-flight measurement LIDAR sensors are already used, for example, in the velocity measurement of vehicles in road traffic.

In this way, it is advantageously possible according to the present invention that a conventional optical sensor which is proven in distance and velocity measurement is used, which moreover enables rapid and precise measurements.

According to another preferred refinement, it is provided that the optical sensor is a structured light sensor, in particular a strip projection sensor. Such structured light sensors are based on triangulation methods. For example, in the case of strip projection, a projector, the light source module here, projects different patterns of dark and light strips in chronological succession, preferably having different widths, onto the object to be measured. For this purpose, the optical sensor preferably encompasses an optical means for generating an optical pattern, in the case of strip projection for generating strips. Such optical means preferably encompass at least one lens and/or one aperture. A detector, the detection module here, which is situated at a defined distance to the projector, detects the strip patterns. On the basis of the known distance and thus the viewing angle between projector and detector, the distance to every point of the measured object may be ascertained, i.e., a structured light sensor is based in principle on triangulation methods. Those skilled in the art understand that in addition to the above-described strips, other patterns may also be used. The strip projection method is thus a special case of the structured light method. In general, in structured light methods, light is thus cast onto an object in the form of chronologically successive, predetermined patterns, the light reflected from the object being measured. A specific pattern is thus projected onto the object in each frame.

In this way, it is advantageously possible according to the present invention that a structured light method is used for distance and/or velocity determination and for object detection, without multiple optical sensors mutually impairing one another. The individual frames, i.e., patterns, are thus generated at the carrier signal frequency. The first detection frequency therefore also has to be at least as high as the carrier signal frequency, to be able to detect at least each frame for the purpose of accurate distance and/or velocity measurement.

According to another preferred refinement, it is provided that the detection module includes a demodulator for demodulating a light signal.

In this way, it is advantageously possible that the identification information is already recognized by the detection module.

According to another preferred refinement, it is provided that the optical sensor includes a control module for controlling the optical sensor. The control module is particularly preferably configured to ascertain a difference signal from the light signal generated by the light source module and the light signal detected by the detection module, the difference signal in particular being a difference of the pieces of identification information. The difference signal thus preferably relates to the timeframe of a frame.

In this way, it is particularly advantageously possible to determine whether a detected light signal is associated with the optical sensor. This is because in the case of a correspondence, i.e., an identical piece of identification information, the difference signal is 0. The control module is preferably configured to compensate for reflection losses and absorption losses.

According to one preferred refinement—in particular of the system according to the present invention—it is provided that the system includes at least one, in particular stationary, base station, the base station including at least one detection module for detecting a light signal, the detection module being configured for differentiating light signals on the basis of pieces of identification information and in particular for identifying a vehicle on the basis of a piece of identification information of the associated light signal.

In this way, it is advantageously possible according to the present invention that a base station may differentiate various autonomous vehicles and the operation of the system may thus be made more efficient. The locating of a vehicle is also advantageously enabled in the system. For example, in the case of logistics systems, this is desirable, since routes may thus be planned more efficiently and monitoring is enabled.

Exemplary embodiments of the present invention are shown in the figures and explained in greater detail below.

DETAILED DESCRIPTION OF EXAMPLE EMBODIMENTS

In the various figures, identical parts are always provided with identical reference numerals and are therefore generally also only named and/or mentioned once in each case.

Figure 1:
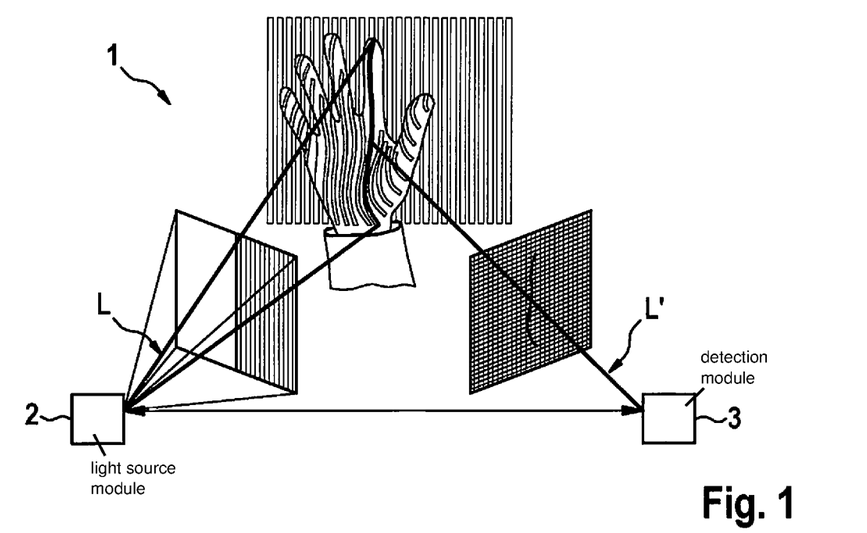
FIG. 1 shows a schematic sketch of an optical sensor according to one specific embodiment of the present invention.

FIG. 1 shows a schematic sketch of an optical sensor 1 according to one specific embodiment of the present invention. Optical sensor 1 is a structured light sensor here, for example, a strip projection sensor. It includes a light source module 2, which is configured to generate a light signal L. In strip projection, the object to be measured is illuminated using a sequence of strips, in particular of different widths, which are alternately light and dark. At a specific point in time, a complete set of strips is projected onto the object. At a following point in time, a different set of strips is projected onto the object. An exemplary light signal L, a light beam L here, is reflected on the object, from which reflected light beam L', corresponding to a light signal L', results.

A detection module 3, which is situated at a fixed distance and a fixed viewing angle in relation to light source module 2, includes a detector which includes a plurality of pixels. This detector detects reflected light beam L' in a specific pixel. Similarly, further reflected light beams originating from light beams of light source module 2 are detected by the detector, whereby the detector obtains an image of the object. In this way, an object recognition, on the one hand, and also a distance measurement in relation to the object are possible.

If multiple such optical sensors 1, 1' are provided, interferences may occur between the particular light beams of sensors 1, 1' and an accurate object measurement or distance measurement may be impaired or even prevented. Light source module 2 therefore furthermore includes a modulator 4 (not shown here), which modulates light signal L in such a way that it includes a piece of identification information. This identification information may be recognized by detection module 3 and thus enables a differentiation between the light beams of different optical sensors 1, 1'.

With respect to the actual distance measurement, optical sensor 1, 1' according to the present invention thus does not fundamentally differ from already known structured light sensors, since the distance measurement functions in the same manner. The concept according to the present invention is thus in particular the provision of an additional information level.

Figure 2:
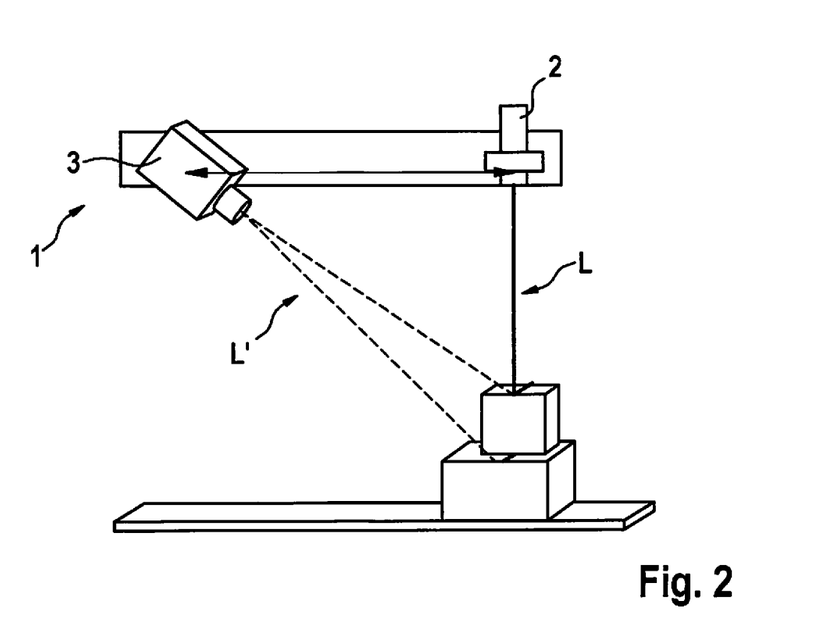
FIG. 2 shows another schematic sketch of an optical sensor according to one specific embodiment of the present invention.

FIG. 2 shows another schematic sketch of an optical sensor 1 according to one specific embodiment of the present invention. Here, optical sensor 1 measures, for example, in a special specific embodiment of the strip projection sensor from FIG. 1 on the basis of a light section method. For this purpose, detector module 3 is again situated at a well-defined distance from light source module 2. Light source module 2 generates a light beam L including a piece of identification information, which is guided here along a line on the object, for example, by a beam deflection unit of light source module 2 such as an adjustable micromirror, or is already projected onto the object by corresponding optical means in the form of a line.

Detection module 3 detects reflected light beam L' originating from light beam L by reflection and the distance to the object may be determined by trigonometry on the basis of the known arrangement between detection module 3 and light source module 2, in particular the enclosed angles.

Figure 3:
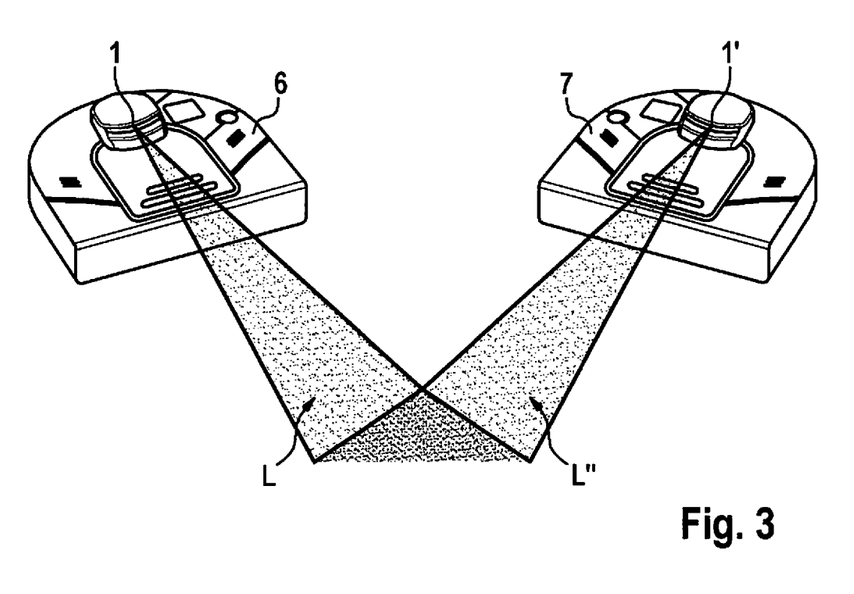
FIG. 3 shows a system according to one specific embodiment of the present invention in a schematic view.

FIG. 3 shows a system according to one specific embodiment of the present invention in a schematic view. The system encompasses a first vehicle 6 and a second vehicle 7 here. Both vehicles 6, 7 are designed in the present case as robot vacuum cleaners. However, the system may additionally or alternatively also encompass other autonomous vehicles. Production robots, automated industrial trucks, and/or self-driving motor vehicles are mentioned here by way of example. First vehicle 6 includes a first optical sensor 1 and second vehicle 7 includes a second optical sensor 1'. Each of optical sensors 1, 1' encompasses a light source module 2, 2' having a modulator 4 and a detection module 3, 3'. First optical sensor 1 emits a light signal L having a piece of identification information which enables an association with optical sensor 1, and second optical sensor 1' emits a light signal L" having a piece of identification information intrinsic thereto.

Detection modules 3, 3' detect incoming light signals L, L', L". In the case of first optical sensor 1, this may be a light signal L' originating from light signal L by reflection at an object, and also (primary) light signal L" of second optical sensor 1'. To reliably recognize an object, in particular to determine its distance from optical sensor 1 and/or its velocity in the case of a moving object, first optical sensor 1 has to be able to differentiate between a reflected light signal L' and a (primary) light signal L" of second optical sensor 1'.

This is possible on the basis of the identification information of light signals L, L', L". In the present case, the pieces of identification information are designed as intensity modulations at a modulation frequency which is significantly higher than the detection frequency of detection modules 3, 3'. For example, light signals L, L', L" are modulated at a modulation frequency of approximately 2 kHz, while detection modules 3, 3' detect light signals L, L', L" at a detection frequency of approximately 50 Hz.

Detection modules 3, 3' are configured to also detect these modulations and thus associate light signals L, L', L" on the basis of the pieces of identification information with associated optical sensor 1, 1', or at least differentiate the intrinsic light signal L and light signal L' originating therefrom by reflection from other light signals L". An error-free distance and/or velocity measurement may thus be carried out.

If a base station is additionally provided in the system, it may preferably associate light signals L, L', L" with optical sensors 1, 1' on the basis of the pieces of identification information. In this way, it knows which vehicle 6, 7 is presently situated in the vicinity.

Figure 4:
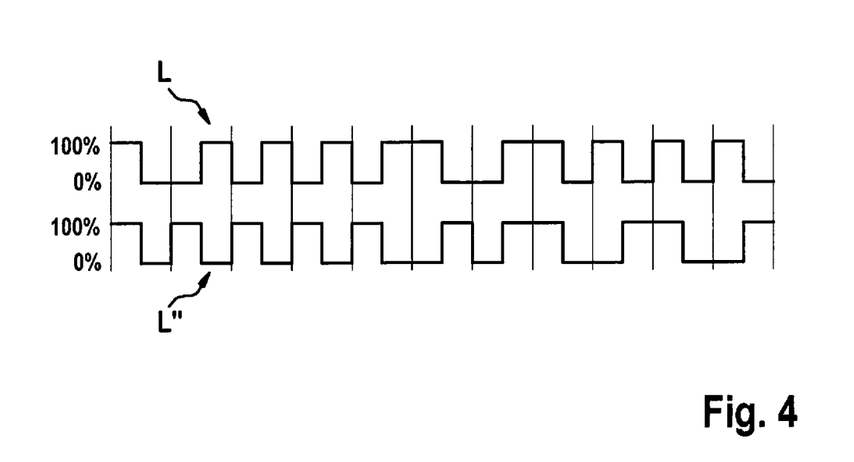
FIG. 4 shows two pieces of identification information according to one specific embodiment of the present invention in a schematic view.

FIG. 4 shows two pieces of identification information according to one specific embodiment of the present invention in a schematic view. Associated light signals L, L" correspond, for example, to light signals L, L' explained in conjunction with FIG. 3. In particular the intensities of light signals L, L" are shown in the time curve here. These pieces of identification information are applied by modulators 4 with the aid of intensity modulation, for example, using a sector aperture rotating at variable speed. It is apparent that the intensity modulation of upper light signal L differs from the modulation of lower light signal L" in the time curve. Depending on the plurality of optical sensors 1, 1' in the system, a more or less complex modulation may be selected as the identification information.

A detection module 3, 3' may detect these pieces of identification information and preferably decode them, so that it may carry out an association of a light beam L, L', L" with an optical sensor 1, 1'. However, detection module 3, 3' may at least identify a light signal L, L', L" originating from light source module 2, 2', which is associated with the same optical sensor.

Figure 5:
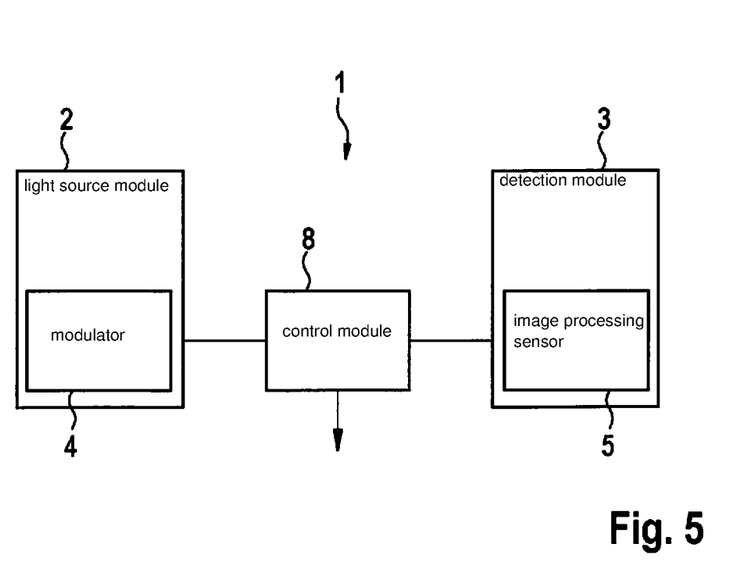
FIG. 5 shows an optical sensor according to one specific embodiment of the present invention in a schematic view.

FIG. 5 shows an optical sensor 1 according to one specific embodiment of the present invention in a schematic view. Optical sensor 1 encompasses a control module 8, which controls the operation of optical sensor 1 and, for example, forwards the pieces of registered distance and/or velocity information to a control unit of a vehicle 6, to use the data for object recognition and/or navigation.

On the one hand, a light source module 2, which encompasses here a laser configured for generating a laser signal L, is connected to control module 8. The light source module furthermore encompasses a modulator 4, which modulates laser signal L in such a way that it includes a piece of identification information, which indicates optical sensor 1, preferably unambiguously. Moreover, control module 8 is connected to a detection module 3, which is configured to detect a light signal L', L". The detection module encompasses here, for example, a dynamic image processing sensor 5.

Optical sensor 1 is, for example, a time-of-flight measurement LADAR sensor (LADAR is an abbreviation for "laser detection and ranging", i.e., laser-assisted distance measurement). In operation, optical sensor 1 emits a laser signal L, which is reflected at an object. Reflected laser signal L' resulting therefrom is detected by detection module 3 and the time-of-flight of laser signal L, L' is determined. The distance to the object may be ascertained therefrom. Alternatively, however, optical sensor 1 may also be a structured light sensor corresponding to the specific embodiments described in conjunction with FIGS. 1 and 2.

Figure 6:
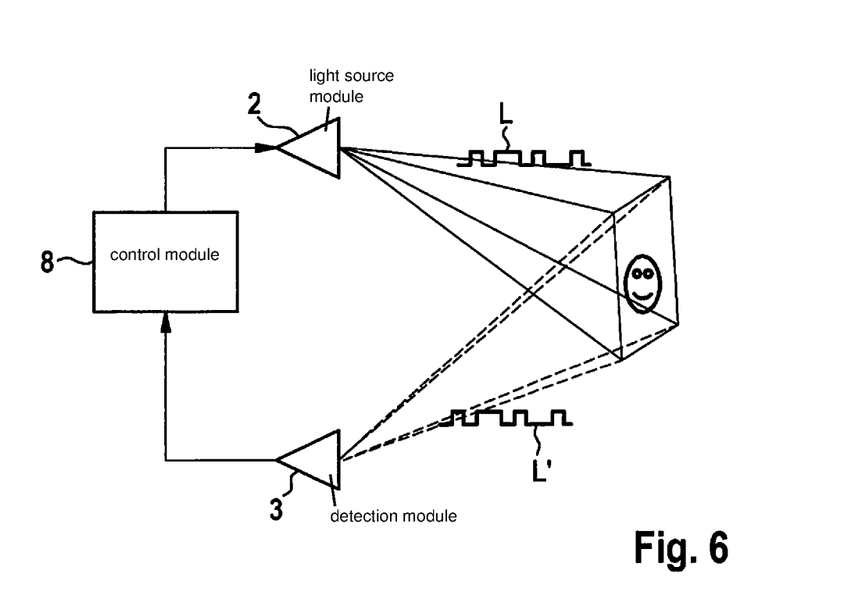
FIG. 6 shows an optical sensor according to one specific embodiment of the present invention in a schematic sketch.

FIG. 6 shows an optical sensor 1 according to one specific embodiment of the present invention in a schematic sketch. Optical sensor 1 shown here is essentially similar to optical sensors 1 described in conjunction with FIGS. 1 and 2, because of which reference is made to the statements in this regard. Optical sensor 1 is provided as a structured light sensor here.

Optical sensor 1 encompasses a control module 8 and a light source module 2 connected thereto, having a modulator 4, which is provided here as software, for example, and a detection module 3. Detection module 3 encompasses a dynamic image processing sensor 5 here by way of example.

Such a dynamic image processing sensor 5 does not register an overall image using a plurality of pixels, a so-called frame, at a specific point in time like conventional camera sensors, but rather only those pixels are registered which detect a change in relation to a preceding point in time. The amount of memory is significantly reduced in this way and moreover a movement recognition is simplified in principle.

Light source module 2 emits a light beam L, onto which modulator 4 has modulated a piece of identification information, in the form of a sequence of intensities of different levels, by way of example, at a modulation frequency, for example, 1 kHz here. An optical means (not shown in greater detail here), for example, a lens and/or an aperture, cast the light in the form of a pattern onto the object to be measured. The patterns are varied at a carrier signal frequency, for example, 1 Hz here. The light is reflected at the object, i.e., a light signal L' is generated, which is detected by detection module 3, more precisely dynamic image processing sensor 5.

Dynamic image processing sensor 5 detects light signal L' on the pixel level at a second detection frequency, which is at least as high as the modulation frequency. The modulation frequency and the second detection frequency are preferably equal. Dynamic image processing sensor 5 thus registers the identification information, i.e., the characteristic sequence of the different intensities here.

Detection module 3 detects the projected and reflected pattern at a first detection frequency, which preferably corresponds to the carrier signal frequency. The distance to the object may be determined in a fundamentally known manner using triangulation and/or photogrammetry methods, on the one hand.

On the other hand, detection module 3, or control module 8 here, is configured to generate a difference signal from detected light signal L' of a frame, i.e., a specific pattern, and emitted light signal L.

Since the identification information is identical here and in the present case the reflection and/or absorption losses are negligible, the difference signal is 0. Control module 8 concludes therefrom that reflected light signal L' actually originates from optical sensor 1, i.e., the distance measurement was correct.

What is claimed is:

1. An optical sensor for distance and/or velocity measurement, comprising:
a light source module configured to generate a light signal; and
a detection module configured to detect a light signal;
wherein the light source module includes a modulator configured to modulate the light signal, the modulator being configured in such a way that the light signal includes a piece of identification information after the modulation, the detection module being configured to detect and identify the piece of identification information of the detected light signal,
wherein the detection module includes a dynamic image processing sensor which includes a plurality of pixels configured such that each pixel of the plurality of pixels detects changes,
wherein the detection module has a first detection frequency and the dynamic image processing sensor has a second detection frequency,
wherein the dynamic image processing sensor registers individual measured values at the second detection frequency, including the identification information, which are combined to form a frame in a time interval corresponding to the first detection frequency.

2. The optical sensor as recited in claim 1, wherein the light source module encompasses a laser, the light signal being a laser signal.

3. The optical sensor as recited in claim 1, wherein the modulator is configured in such a way that the light signal has a modulation frequency which is in a range between 100 Hz to 1 MHz.

4. The optical sensor as recited in claim 1, wherein the modulator is configured in such a way that the light signal has a modulation frequency which is in a range between 1 kHz and 100 kHz.

5. The optical sensor as recited in claim 1, wherein the modulator is configured in such a way that the light signal has a modulation frequency which is 2 kHz.

6. The optical sensor as recited in claim 1, wherein the first detection frequency being in a range from 1 Hz to 100 Hz, and/or the second detection frequency being in a range from 100 Hz to 1 MHz.

7. The optical sensor as recited in claim 1, wherein the first detection frequency in the range from 10 Hz to 75 Hz, and/or the second detection frequency being in a range between 1 kHz and 100 kHz.

8. The optical sensor as recited in claim 1, wherein the first detection frequency being in a range from 30 Hz to 60 Hz, and/or the second detection frequency being at least as high as the modulation frequency.

9. The optical sensor as recited in claim 1, wherein the modulation is a frequency modulation, an amplitude modulation, and/or an intensity modulation.

10. The optical sensor as recited in claim 1, wherein the optical sensor is a LIDAR sensor, and/or the optical sensor is a structured light sensor.

11. A system for mobility monitoring of autonomous vehicles, having at least one first vehicle having a first optical sensor, the first optical sensor comprising:
a light source module configured to generate a light signal; and
a detection module configured to detect a light signal;
wherein the light source module includes a modulator configured to modulate the light signal, the modulator being configured in such a way that the light signal includes a piece of identification information after the modulation, the detection module being configured to detect and identify the piece of identification information of the detected light signal;
wherein the detection module of the first optical sensor is configured to differentiate a light signal originating by reflection from the light signal of the first optical sensor from a further light signal of a further optical sensor on the basis of the identification information, wherein the detection module includes a dynamic image processing sensor which includes a plurality of pixels configured such that each pixel of the plurality of pixels detects changes, wherein the detection module has a first detection frequency and the dynamic image processing sensor has a second detection frequency, wherein the dynamic image processing sensor registers individual measured values at the second detection frequency, including the identification information, which are combined to form a frame in a time interval corresponding to the first detection frequency.

12. The system as recited in claim 11, wherein the system includes at least one base station which is stationary, the base station including at least one second detection module for detecting a light signal, the second detection module being configured to differentiate light signals on the basis of pieces of identification information and to identify a vehicle on the basis of a piece of identification information of an associated light signal.

13. A method for mobility monitoring of autonomous vehicles in a system, the system including having at least one first vehicle having a first optical sensor, the first optical sensor comprising a light source module configured to generate a light signal, and a detection module configured to detect a light signal, wherein the light source module includes a modulator configured to modulate the light signal, the modulator being configured in such a way that the light signal includes a piece of identification information after the modulation, the detection module being configured to detect and identify the piece of identification information of the detected light signal, wherein the detection module of the first optical sensor is configured to differentiate a light signal originating by reflection from the light signal of the first optical sensor from a further light signal of a further optical sensor on the basis of the identification information, the method comprising:

emitting, by the first optical sensor, a light signal having the piece of information; and detecting, by the detection module of the first optical sensor, a light signal and identifying an associated optical sensor on the basis of identification information of the light signal, wherein the detection module includes a dynamic image processing sensor which includes a plurality of pixels configured such that each pixel of the plurality of pixels detects changes, wherein the detection module has a first detection frequency and the dynamic image processing sensor has a second detection frequency, wherein the dynamic image processing sensor registers individual measured values at the second detection frequency, including the identification information, which are combined to form a frame in a time interval corresponding to the first detection frequency.

\* \* \* \* \*